United States Patent
Louzoun et al.

(10) Patent No.: US 6,925,512 B2
(45) Date of Patent: Aug. 2, 2005

(54) COMMUNICATION BETWEEN TWO EMBEDDED PROCESSORS

(75) Inventors: Eliel Louzoun, Jerusalem (IL); Yifat Ben-Shahar, Mevaseret Zion (IL)

(73) Assignee: Intel Corporation, Santa Clara, CA (US)

( * ) Notice: Subject to any disclaimer, the term of this patent is extended or adjusted under 35 U.S.C. 154(b) by 454 days.

(21) Appl. No.: 09/976,284

(22) Filed: Oct. 15, 2001

(65) Prior Publication Data

US 2003/0074502 A1 Apr. 17, 2003

(51) Int. Cl.[7] ............................................. G06F 13/00
(52) U.S. Cl. ..................... 710/100; 710/22; 710/308; 709/200; 714/9; 714/11; 714/12; 714/43
(58) Field of Search ................... 700/2, 4–5; 711/147, 711/130; 714/9, 11–13, 43; 710/22, 100, 308

(56) References Cited

U.S. PATENT DOCUMENTS

| | | | | |
|---|---|---|---|---|
| 4,217,486 A | * | 8/1980 | Tawfik et al. .................. 700/4 |
| 4,428,044 A | * | 1/1984 | Liron .......................... 714/12 |
| 4,502,114 A | * | 2/1985 | Krikor et al. ................ 710/105 |
| 5,185,877 A | * | 2/1993 | Bissett et al. ................. 710/22 |
| 5,317,726 A | * | 5/1994 | Horst .......................... 714/12 |
| 5,446,841 A | * | 8/1995 | Kitano et al. ................ 709/213 |
| 5,590,308 A | * | 12/1996 | Shih ........................... 711/136 |
| 5,636,361 A | * | 6/1997 | Ingerman .................... 711/150 |
| 5,923,339 A | * | 7/1999 | Date et al. ................... 345/505 |
| 6,055,605 A | * | 4/2000 | Sharma et al. .............. 711/130 |
| 6,092,136 A | * | 7/2000 | Luedtke ...................... 710/107 |
| 6,094,710 A | * | 7/2000 | Arimilli et al. ............. 711/153 |
| 6,101,589 A | * | 8/2000 | Fuhrmann et al. .......... 711/169 |
| 6,119,176 A | * | 9/2000 | Maruyama .................... 710/25 |
| 6,351,744 B1 | * | 2/2002 | Landresse ....................... 707/8 |
| 6,415,361 B1 | * | 7/2002 | Moh et al. .................. 711/141 |
| 6,526,462 B1 | * | 2/2003 | Elabd ......................... 710/242 |
| 6,647,453 B1 | * | 11/2003 | Duncan et al. ............. 710/306 |
| 6,651,139 B1 | * | 11/2003 | Ozeki et al. ................ 711/118 |
| 6,701,411 B2 | * | 3/2004 | Matsunami et al. ........ 711/114 |
| 6,813,652 B2 | * | 11/2004 | Stadler et al. ................ 710/22 |
| 2002/0082716 A1 | * | 6/2002 | Hashimoto et al. ............ 700/2 |
| 2002/0129208 A1 | * | 9/2002 | Barroso et al. ............. 711/141 |
| 2002/0161452 A1 | * | 10/2002 | Peltier ........................... 700/2 |
| 2002/0161453 A1 | * | 10/2002 | Peltier ........................... 700/5 |
| 2002/0184445 A1 | * | 12/2002 | Cherabuddi ................ 711/130 |
| 2003/0009629 A1 | * | 1/2003 | Gruner et al. .............. 711/130 |
| 2003/0120896 A1 | * | 6/2003 | Gosior et al. ................ 712/32 |
| 2004/0022107 A1 | * | 2/2004 | Zaidi et al. ................. 365/202 |
| 2004/0054855 A1 | * | 3/2004 | Yasuda et al. .............. 711/147 |
| 2004/0172490 A1 | * | 9/2004 | Stadler et al. ................ 710/22 |

OTHER PUBLICATIONS

Bisiani, Roberto, et al., "PLUS: A Distributed Shared–Memory System," May 28–31, 1990, IEEE 17th Annual International Symposium on Computer Architecture, Proceedings, p. 115–124.*

Bodnar, B.L., et al., "Modeling and Performance Analysis of Single–Bus Tightly–Coupled Multiprocessors," Mar. 1989, IEEE Transactions on Computers, vol. 38, p. 464–470.*

* cited by examiner

Primary Examiner—Mark H. Rinehart
Assistant Examiner—Donna K. Mason
(74) Attorney, Agent, or Firm—Pearl Cohen Zedek Latzer, LLP

(57) ABSTRACT

A system including at least two processing units embedded on a chip able to communicate with each other and to generally independently control access to data from memory on the chip.

17 Claims, 4 Drawing Sheets

COMMUNICATION BETWEEN TWO EMBEDDED PROCESSORS

BACKGROUND OF THE INVENTION

There are chips produced today that have more than one central processing unit (CPU) embedded on the same chip. These chips may be used in ways that require communication between the CPUs. An example of a situation requiring such communication is the case of a chip being used for communication with a network. Another example may occur in calculations for graphics rendering.

The CPUs on the chip often need to share processing results. This usually requires that the CPUs share data structures in memory. This requires common management of the shared memory. Unfortunately, common memory management adds complexity to the interface between the CPUs. When the CPUs use asynchronous clocks, the complexity of the interface is even greater.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings, in which:

DETAILED DESCRIPTION OF THE PRESENT INVENTION

The following well-known acronyms are used throughout this description: central processing unit (CPU); random access memory (RAM); direct memory access (DMA); first in, first out (FIFO); media access control (MAC) and physical layer device (PHY).

Applicants have designed a system and method for communication between processing units embedded on a single chip. In some embodiments of the current invention, the processing units may independently control separate sections of memory and may transfer data to each other by means of a buffer. In such a system, the problem of common management of the memory by multiple processing units may be alleviated. In some embodiments, the processing units may work with asynchronous clocks. When data is transferred between processing units through a buffer, the data synchronization task may be simplified. The invention may be especially suited but not limited to processing units implementing functions in which the communication between the processing units is serial in nature. In such cases, the processing units may be referred to as being loosely coupled.

In the embodiments of the chip described hereinbelow, a CPU is used as an exemplar processing unit. A RAM is used as an exemplary memory. A DMA is used as an exemplary data flow control unit. A FIFO is used as an exemplary buffer. It is understood that these represent only one among many embodiments of the present invention. Other types of processing units, memory, data flow control units, and buffers are included within the scope of this invention.

Figure 1:
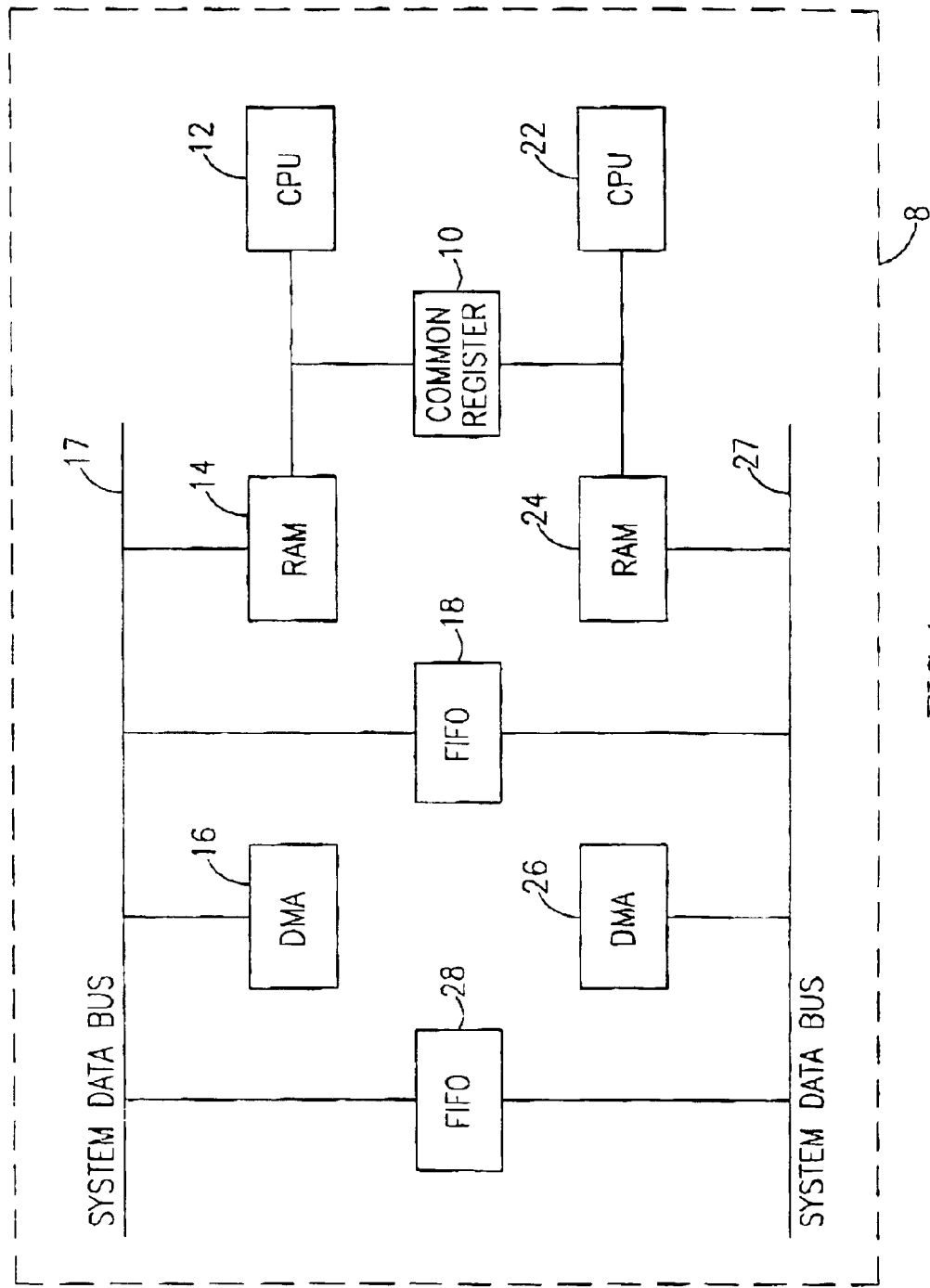
FIG. 1 is a block diagram illustration of a chip in accordance with an embodiment of the present invention.

Reference is now made to FIG. 1, which is a block diagram illustration of a chip 8, in accordance with an embodiment of the present invention. Chip 8 may comprise at least one common register 10, two CPUs 12 and 22, two RAMs 14 and 24, two DMAs 16 and 26, two system data buses 17 and 27, and two FIFOs 18 and 28.

The CPUs 12 and 22 may have been de-coupled so that they may operate independently. Thus, the state of one CPU may not affect the state of the other. Each CPU 12 and 22 may have a separate memory space RAMs 14 and 24. Furthermore, CPUs 12 and 22 may not share any RAM. CPU 12 may access only RAM 14 and CPU 22 may only access RAM 24. Thus, there may be no conflicting attempts to access memory.

Multiple levels of processing may be required for data transmission or receipt. For example, a first set of processing may be performed by CPU 12 and a second set of processing may be performed by CPU 22. Thus, CPU 12 may need to send data that it may have processed to CPU 22. CPU 12 may instruct DMA 16 to transfer data located in RAM 14 to CPU 22. These instructions may include, for example, the data location and data length or data start and data end. The data may be copied to FIFO 18 under the control of DMA 16 on system data bus 17. DMA 16 may inform CPU 12 that the data has been sent.

DMA 26 may be instructed by CPU 22 to await a data transmission. DMA 26 may retrieve the data from FIFO 18 and may write it to RAM 24 using system data bus 27. DMA 26 may inform CPU 22 that all the data has been received. Other information may also be shared between CPUs 12 and 22. Such information may be stored in common register 10 by CPU 12 and read from register 10 by CPU 22 (or vice versa).

In data transmission from CPU 22 to CPU 12, the process is reversed. CPU 22 may instruct DMA 26 to transfer data located in RAM 24 to CPU 12. The data may be copied to FIFO 28 under the control of DMA 26 on system data bus 27. DMA 26 may inform CPU 22 that the data has been sent. DMA 16 may have been instructed to await a data transmission, may retrieve the data from FIFO 28, and may write it to RAM 14 using system data bus 17. DMA 16 may inform CPU 12 that data has been received.

It should be noted that, from the perspective of CPU 12, FIFO 18 may be write only and FIFO 28 may be read only. From the perspective of CPU 22, FIFO 18 may be read only and FIFO 28 may be write only.

Additional common registers, CPUs, RAMs, DMAs, system data buses, and FIFOs are also within the scope of this invention. Additionally, having only one FIFO, DMA, and/or system data bus is also within the scope of this invention.

Figure 2:
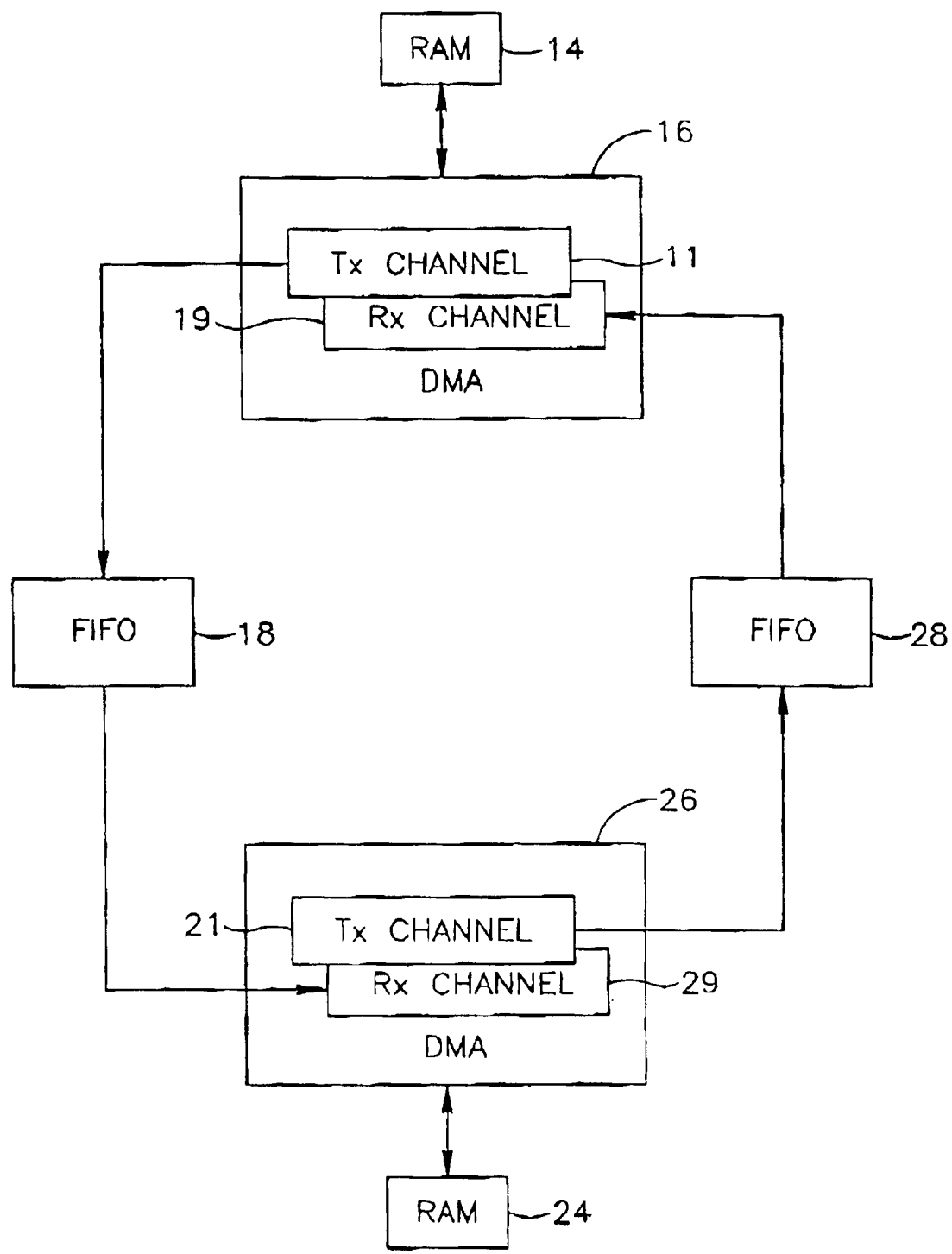
FIG. 2 is a data flow illustration of data transmission in the chip of FIG. 1, in accordance with an embodiment of the present invention.

Reference is now made to FIG. 2, a data flow illustration of data transmission from RAM 14 to RAM 24 and from RAM 24 to RAM 14, in accordance with an embodiment of the present invention. Data flow direction is indicated by the arrows. Elements described with respect to FIG. 1 are numbered similarly. DMAs 16 and 26 may each comprise at least two channels, of which one channel may be used for read operations and one channel may be used for write operations. Receive channels are referred to hereinbelow as Rx channel 19 and Rx channel 29 for DMA 16 and 26 respectively. Transmit channels are referred to hereinbelow as Tx channel 11 and Tx channel 21 for DMA 16 and 26 respectively.

Each side of FIFO 18/28 may be handled by a different DMA 16/26. For example, data input to FIFO 18 may be controlled by Tx channel 11, while data read from FIFO 18 way be controlled by Rx channel 29. Data input to FIFO 28 may be controlled by Tx channel 21, while data read from FIFO 28 may be controlled by Rx channel 19. Thus, each FIFO 18/28 may control the flow of data on both sides, which may ensure that no underflow or overflow errors will occur. FIFO 18/28 may be as small as 2–4 words long, since correct data receipt and transmission may have been assured.

An exemplary embodiment of the system and method of the present invention may be described using a chip with two processing units that may implement the media access control (MAC) and the physical layer protocol (PHY) of a network communication system. Devices attached to a network may need to handle information transfer to and from the network. There are known standards for handling this communication. The PHY and MAC protocols implement different layers of the networking protocol used to access a network.

In an embodiment of the present invention, two CPUs are embedded on the same chip. Thus, CPU 12 may control the MAC protocol implementation, whereas CPU 22 may control the PHY protocol implementation. Such an implementation may include both receive and transmit functions. This example is given for clarity purposes only and does not limit the scope of the invention.

CPU 12 may be instructed by the system in which the chip is embedded to transfer data to the network. CPU 12 may perform initial data processing using the MAC protocol, for example, packetizing the data. CPU 12 may instruct DMA 16 to send the required data. CPU 12 may write information to common register 10, for example, status information, so that it may be used by CPU 22 if necessary. Tx channel 11 may retrieve the data from the correct location in RAM 14 and may write the data into FIFO 18 in packets. When a data packet is present in FIFO 18, DMA Rx channel 29 may retrieve it, may write the packet to RAM 24, and may signal CPU 22 that data was received. CPU 22 may convert the packet data to the PHY format and may send it to the network.

When a packet is received by the device from the network, CPU 22 may be instructed to retrieve the packet. CPU 22 may convert the packet according to the PHY protocol and may write the converted packet data to RAM 24. CPU 22 may also write to common register 10, information that may be needed by CPU 12, such as timing decisions. CPU 22 may instruct Tx channel 21 to send the packet to CPU 12. Tx channel 21 may retrieve the packet data from RAM 24 and may write it to FIFO 28. Rx channel 19 may read file data from FIFO 28 and may write it to RAM 14. Rx channel 19 may then send a signal to CPU 12 that a packet has been received. CPU 12 may further process the data according to the MAC protocol and may inform the device that network data has been received.

It is noted that the channels of DMA 16/26 are not limited to either receive or transmit functionality. Rather, it is for the duration of a given transaction that a channel may only communicate in one direction.

In a further embodiment of the present invention, information may be sent only in one direction between multiple CPUs, and thus only one FIFO may be required. There are graphic applications, for example, in which no data is received from the screen. In such a case, data may only be sent from CPU 12 to CPU 22. CPU 12 may instruct Tx channel 11 to retrieve the data from the correct location in RAM 14 and to write it into FIFO 18 as described hereinabove. Rx channel 29 may retrieve the data, may write it to RAM 24, and may signal CPU 22 as described hereinabove.

If no data is sent from the screen, it may not be necessary to include FIFO 28 or the DMA channels controlling it, Tx channel 21 or Rx channel 19. Thus, an embodiment comprising a single FIFO and DMAs comprising a single channel is within the scope of the present invention.

Figure 3:
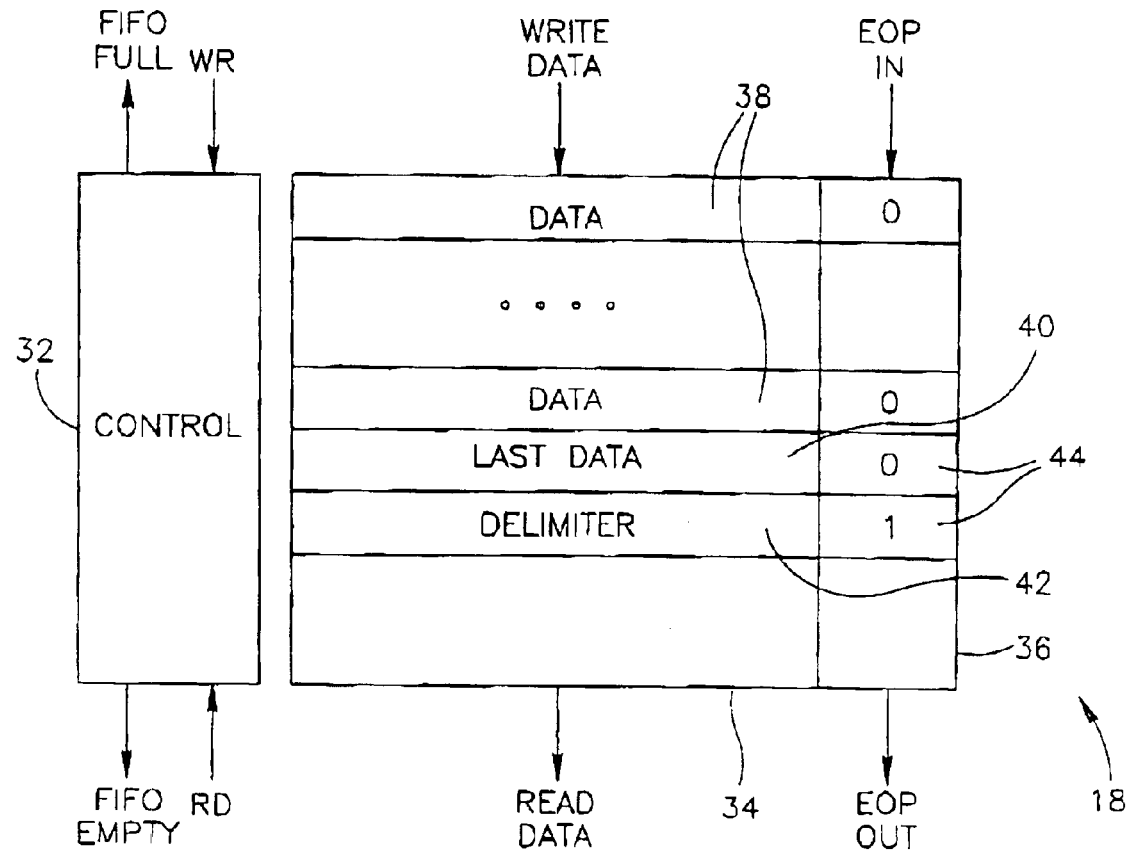
FIG. 3 is a block diagram illustration of the first in, first out (FIFO) of FIG. 1, in accordance with an embodiment of the present invention.

FIG. 3, to which reference is now made, is a block diagram of exemplary FIFO 18, in accordance with an embodiment of the present invention. FIFO 18 may comprise control 32, data block 34, and side information block 36, and may process various signals. For example, control 32 may receive write (WR) signals from, and may output FIFO full signals to, Tx channel 11. Control 32 may also receive read (RD) signals from, and may output FIFO empty signals to, Rx channel 21. Data block 34 may receive data from system data bus 17 and may in turn output data to system data bus 27. Side information block 36 may receive an EOP_in signal from Tx channel 11 and may output an EOP_out signal to Rx channel 21. An EOP_out signal may alert Rx channel 21 that all data has been read.

It is noted that the specific signals given in the embodiments described herein are only examples of the types of signals that may be used. Other signals may be used as appropriate and are within the scope of this invention.

Data block 34 may comprise a predetermined number of rows, for example 2–4. Each row may be a fill data row 38, a last data row 40, or a delimiter row 42. Each row in data block 34 may comprise a predetermined number of bits, for example, 128 bits. Delimiter row 42 may contain the number of the last byte containing valid data in last data row 40. Delimiter row 42 may also contain other required statuses.

Side information block 36 may comprise rows of end of packet (EOP) flags 44. There may be one row in side information block 36 for each row in data block 34. FIFO 18 may handle side information block 36 as if it were part of data block 34. The row in side information block 36 may be as long as necessary to contain the flag. For example, EOP flag 44 may be one bit long and thus restricted to a 0/1 Boolean value. In another example, the EOP flag may indicate start, middle, and end conditions, necessitating at least two bits. Further embodiments are possible and are within the scope of this invention. For clarity purposes only, a simple 0/1, EOP false/true flag is used in the description hereinbelow. Upon receipt of an EOP_in signals a "1" may be written in the row of EOP flags 44 corresponding to delimiter row 42. In all other rows, EOP flags 44 contains a "0".

Data may be written into data block 34 as it is received, until either a FIFO full signal is received or an end of transmission is reached. Upon receipt of a FIFO full signal, data writing may halt until FIFO 18 is no longer full. When the end of transmission is reached, an EOP_in signal may be asserted and a value may be written into delimiter row 42. Last data row 40 may contain invalid data if the written data does not fill the entire row. The value of delimiter row 42 may be used to find the number of the last byte of valid data.

In a further embodiment of the present invention, data may be word aligned. In such a case, delimiter row 42 may not be necessary and the end of packet may be indicated in last data row 40.

Data may be read from data block 34 until either a FIFO empty signal is received or an EOP_out signal is received.

Upon receipt of a FIFO empty signal, data reading may halt until FIFO 18 contains data. When EOP flags 44 contains the value corresponding to end of data, in our example a 1, an EOP_out signal may be transmitted. Upon receipt of an EOP_out signal, the value contained in delimiter row 42 may be read. CPU 22 may use this value to calculate the last valid data byte it received from last data row 40.

In further embodiment of the present invention, DMA 16/26 may calculate the amount of data received.

FIFO 18 may provide flow control for data transmission and receipt to DMAs 16 and 26. DMAs 16 and 26 may start and stop data flow in response to the various signals described. Thus, as data may not be subject to overflow/underflow conditions, it may be possible to have only 2–4 rows.

Figures 4A, 4B:
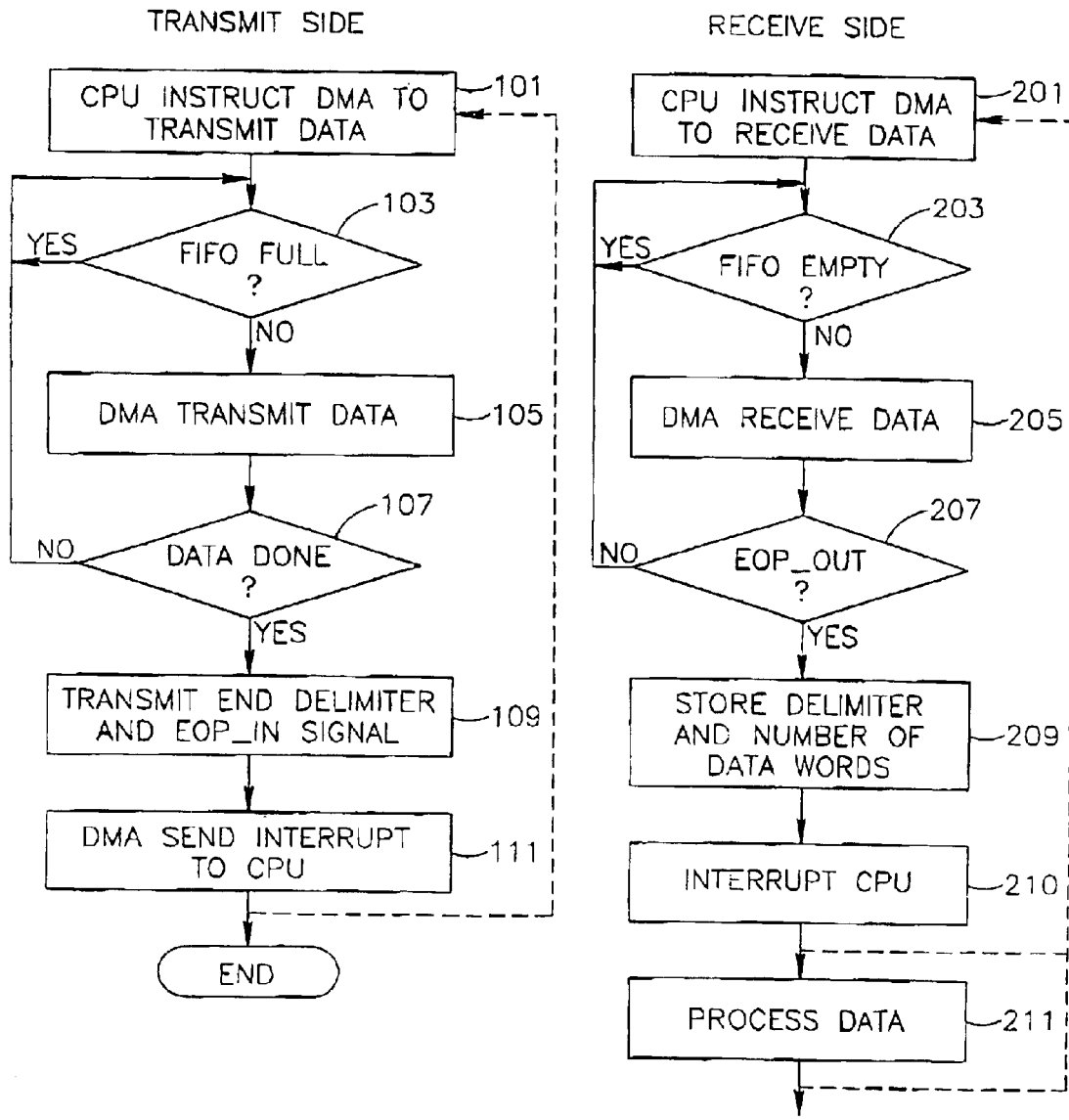
FIGS. 4A and 4B are flow chart illustrations of the transmit and receive functionality implemented in the chip of FIG. 1, in accordance with an embodiment of the present invention.

Reference is now made to FIGS. 4A and 4B, which are flow chart diagrams of the functionality implemented in chip 8 (of FIG. 1), in accordance with an embodiment of the present invention. Other implementations are possible and are within the scope of the present invention. FIG. 4A shows the steps performed on the transmission side, whereas FIG. 4B depicts the steps of the receive side.

Hereinbelow reference is made to CPU 12, RAM 14, DMA 16, system data bus 17, and FIFO 18. Equivalently, CPU 22, RAM 24, DMA 26, system data bus 27, and FIFO 28 could be used.

The data transmission process will be described first. CPU 12 may instruct DMA 16 to transmit a given amount of data found in RAM 14 at a given location (step 101). If FIFO 18 is full it may transmit a FIFO full signal to DMA 16 (step 103), which may cause DMA 16 to wait until data is read from FIFO 18, thus freeing space for DMA 16 to write to.

If no FIFO full signal is received, DMA 16 may send a WR signal to control 32 of FIFO 18. DMA 16 may write a row of data into FIFO 18 (step 105). Additionally, an appropriate value, for example a "0" indicating a row of data, may be entered in EOP flags 44. A check may be performed to see if all the a has been written (step 107). If not, steps 103, 105, and 107 may be repeated until all data has been written to FIFO 18. As mentioned previously, the last row of data, last data row 40, may contain invalid data (garbage) if the data is not aligned to fill the row.

Once all data is written, an additional row may be written into data block 34, delimiter row 42 (step 109). This row may, for example, contain the number of the last byte containing actual data in the previous row (last data row 40). In another embodiment, for example, delimiter row 42 may contain the length of the data. At generally the same time, DMA 16 may send an EOP_in signal to FIFO 18 (step 109) causing an appropriate value, for example a value indicating end of data (such as a 1), to be written into EOP flags 44, DMA 16 may further send a signal to CPU 12 indicating that the data has been transmitted (step 111). At this point DMA 16 may be finished with the current data transmission. It is available if another data transmission is required, possibly from another memory location in RAM 14 (optional return to step 101).

Data receipt will now be described. CPU 12 may instruct DMA 16 to receive data and to write it to a given location in RAM 14 (step 201). DMA 16 may check if FIFO 18 is empty (step 203), for example, if it received a FIFO empty signal. If FIFO 18 is empty, DMA 16 may wait until there is data. If FIFO 18 contains data, DMA 16 may send a RD signal to FIFO 18 and may begin reading the data one row at a time (step 205).

After each data row is read a check may be made (step 207) to determine whether an EOP_out signal has been sent by FIFO 18. If EOP flags 44 indicates the end of data, for example by containing a 1, the EOP_out signal may be sent. If an EOP_out signal is not received, then steps 203, 205, and 207 may be performed until all data is read.

Upon receipt of the EOP_out signal, DMA 16 may store the delimiter and the number of received data rows (step 209) and may further send an interrupt signal to CPU 12 informing it of the receipt of the data transmission (step 210). Upon receipt of the interrupt, CPU 22 may read the delimiter and the number of received data rows and calculate how much data was received.

The data may be processed by CPU 12 (step 211). Processing may include calculating the amount of data received. The number of full rows of data may be multiplied by the number of bytes in a row to calculate an "initial total bytes" value. The number of bytes of actual data in the last data row, which is given in end delimiter row, may be added to initial total bytes producing "total bytes". Total bytes may be the number of bytes of data that were received. Other data processing may also be done by CPU 12.

CPU 12 may re-instruct DMA 16 to await data reception but may change the location in RAM 14 to write to (return to step 201). This may be done after step 210 or step 211.

There may be systems that use asynchronous clocks to control CPU activities. Asynchronous clocks may have different clock speeds or different phases, which may allow different rates of transmission to be set by different clocks. In a system using asynchronous clocks, synchronization between different CPUs which must share information may be complicated. Since the present invention may comprise FIFOs, these same FIFOs may also be used for data synchronization.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A chip comprising:
   at least two processing units with separate memories and separate busses, wherein said at least two processing units exchange data therebetween by transferring said data between said memories;
   a first in first out (FIFO) unit to transfer said data between said busses;
   a first direct memory access (DMA) channel to transfer said data from a first memory of said memories to said FIFO unit; and
   a second DMA channel to transfer said data from said FIFO unit to a second memory of said memories,
   wherein said data is transferred between said first and second memories via said first DMA channel, said FIFO unit, and said second DMA channel.

2. A chip according to claim 1 wherein said processing units are central processing units (CPUs).

3. A chip according to claim 1 and further comprising at least two asynchronous clocks to control said at least two processing units.

4. A chip according to claim 1 wherein one of said processing units is to process media access control (MAC) commands and another of said processing units is to process physical layer device (PHY) commands of a networking protocol.

5. A chip according to claim 1 wherein said memories are random access memories (RAMs).

6. A chip according to claim 1 and further comprising a common register accessible by said processing units to act as a channel of communication by which said processing units are to coordinate exchange of said data between them.

7. A method for transferring data between processing units comprising:

sending data from a first processing unit embedded on a chip to a second processing unit embedded on said chip by establishing a first direct memory access (DMA) channel to a first in first out (FIFO) unit from a first memory directly accessible only by said first processing unit, and a second DMA channel from said FIFO unit to a second memory directly accessible only by said second processing unit, wherein said data is transferred between said first and second memories via said first DMA channel, said FIFO unit, and said second DMA channel.

8. A method according to claim 7 wherein operation of said first DMA channel comprises any of the actions selected from the group consisting of:

transferring data from said first memory to said FIFO unit on request by said first processing unit;

waiting until said FIFO unit is not full before transferring each row of said data; and notifying said first processing unit when all of said data has been transferred to said FIFO unit.

9. A method according to claim 7 wherein operation of said second DMA channel comprises any of the actions selected from the group consisting of:

transferring data from said FIFO to said second memory on request by said second processing unit;

waiting until said FIFO unit is not empty before transferring each row of said data; and notifying said second processing unit when all of said data has been transferred to said second memory.

10. A method according to claim 7 wherein said first processing unit and said second processing unit are CPUs.

11. A method according to claim 7 wherein said first memory and said second memory are RAMs.

12. A device including a chip wherein said chip comprises:

at least two processing units with separate memories and separate busses, wherein said at least two processing units exchange data therebetween by transferring said data between said memories;

a first in first out (FIFO) unit to transfer said data between said busses;

a first direct memory access (DMA) channel to transfer said data from a first memory of said memories to said FIFO unit; and a second DMA channel to transfer said data from said FIFO unit to a second memory of said memories, wherein said data is transferred between said first and second memories via said first DMA channel, said FIFO unit, and said second DMA channel.

13. A device according to claim 12 wherein said processing units are central processing units (CPUs).

14. A device according to claim 12 wherein said chip further comprises at least two asynchronous clocks to control said at least two processing units.

15. A device according to claim 12 wherein one of said processing units is to process media access control (MAC) commands and another of said processing units is to process physical layer device (PHY) commands of a networking protocol.

16. A device according to claim 12 wherein said memories are random access memories (RAMs).

17. A device according to claim 12 wherein said chip further comprises a common register accessible by said processing units to act as a channel of communication by which said processing units are to coordinate exchange of said data therebetween.

* * * * *